United States Patent
Korenfeld et al.

(10) Patent No.: US 9,585,014 B2
(45) Date of Patent: Feb. 28, 2017

(54) FAST RECOVERY FROM CIPHERING KEY MISMATCH

(71) Applicant: Marvell International Ltd., Hamilton (BM)

(72) Inventors: Boris Korenfeld, Bat-Yam (IL); Avner Lamy, Holon (IL); Michael Tadmor, Hod-Hasharon (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 91 days.

(21) Appl. No.: 14/578,682

(22) Filed: Dec. 22, 2014

(65) Prior Publication Data

US 2015/0180658 A1 Jun. 25, 2015

Related U.S. Application Data

(60) Provisional application No. 61/920,218, filed on Dec. 23, 2013.

(51) Int. Cl.
  *H04W 12/02* (2009.01)
  *H04W 12/04* (2009.01)
  H04L 29/12 (2006.01)
  H04W 80/04 (2009.01)

(52) U.S. Cl.
  CPC ........... *H04W 12/04* (2013.01); *H04W 12/02* (2013.01); *H04L 61/6086* (2013.01); *H04W 80/045* (2013.01)

(58) Field of Classification Search
  CPC .. H04W 12/02; H04W 80/045; H04L 61/6086
  See application file for complete search history.

(56) References Cited

U.S. PATENT DOCUMENTS

| | | | |
|---|---|---|---|
| 8,582,768 B2 | 11/2013 | Alexander et al. | |
| 2011/0167264 A1* | 7/2011 | Takahashi | H04L 9/083 713/168 |
| 2011/0263221 A1* | 10/2011 | Yi | H04L 1/0061 455/410 |
| 2013/0329557 A1* | 12/2013 | Petry | H04L 63/0272 370/235 |

OTHER PUBLICATIONS

3GPP TS 25.322, "3rd Generation Partnership Project;Technical Specification Group Radio Access Network; Radio Link Control (RLC) protocol specification", Release 11, version 11.0.0, 90 pages, Sep. 2012.

3GPP TS 33.102, "3rd Generation Partnership Project;Technical Specification Group Services and System Aspects; 3G Security;Security architecture", Release 11, version 11.0.0, 71 pages, Sep. 2011.

* cited by examiner

*Primary Examiner* — Ellen Tran

(57) ABSTRACT

A method includes, in a receiver, identifying an event that involves replacement of a ciphering key used by the receiver. In response to the event, at least a portion of a payload of an Internet Protocol (IP) packet received by the receiver is deciphered using the replaced ciphering key. A verification is made whether a predefined location in the deciphered portion of the IP packet, which is expected to specify an IP version of the IP packet, indeed specifies a valid IP version. Upon detecting that the location does not specify the valid IP version, a recovery process that recovers from improper replacement of the ciphering key is initiated.

18 Claims, 2 Drawing Sheets

FAST RECOVERY FROM CIPHERING KEY MISMATCH

CROSS-REFERENCE TO RELATED APPLICATIONS

This application claims the benefit of U.S. Provisional Patent Application 61/920,218, filed Dec. 23, 2013, whose disclosure is incorporated herein by reference.

FIELD OF THE DISCLOSURE

The present disclosure relates generally to wireless communication, and particularly to methods and systems for recovering from ciphering key mismatch.

BACKGROUND

The Universal Mobile Telecommunications System (UMTS) standards specified by the Third Generation Partnership Project (3GPP) define the Ciphering mechanisms carried out in the Radio Link Control (RLC) layer of UMTS equipment. The RLC layer is defined, for example, in "Universal Mobile Telecommunications System (UMTS); Radio Link Control (RLC) Protocol Specification (Release 11)," 3GPP TS 25.322, version 11.0.0, September, 2012, which is incorporated herein by reference. Ciphering in UMTS is defined, for example, in "3G Security; Security architecture (Release 11)," 3GPP TS 33.102, version 11.0.0, September, 2011, which is incorporated herein by reference.

U.S. Pat. No. 8,582,768, whose disclosure is incorporated herein by reference, describes a method in a receiver that includes receiving from a transmitter a sequence of communication packets. Carry data is encrypted with an encryption scheme. The encryption scheme depends on a counter value that is incremented independently by each of the transmitter and the receiver. Attempts are made to decrypt the data of a received packet multiple times using different, respective counter values, to produce multiple respective decrypted outputs. A decrypted output in which the data has been decrypted correctly is identified, the counter value is corrected, and the data of the received packet is recovered from the identified decrypted output.

The description above is presented as a general overview of related art in this field and should not be construed as an admission that any of the information it contains constitutes prior art against the present patent application.

SUMMARY

An embodiment that is described herein provides a method including, in a receiver, identifying an event that involves replacement of a ciphering key used by the receiver. In response to the event, at least a portion of a payload of an Internet Protocol (IP) packet received by the receiver is deciphered using the replaced ciphering key. A verification is made whether a predefined location in the deciphered portion of the IP packet, which is expected to specify an IP version of the IP packet, indeed specifies a valid IP version. Upon detecting that the location does not specify the valid IP version, a recovery process that recovers from improper replacement of the ciphering key is initiated.

In some embodiments, verification of the IP version and initiation of the recovery process are performed in a Radio Link Control (RLC) layer of the receiver. In an embodiment, deciphering the portion includes identifying a Protocol Data Unit (PDU) that immediately follows the event and contains a beginning of the IP packet, and deciphering the beginning of the IP packet extracted from the identified PDU. In an example embodiment, identifying the PDU includes verifying that a sequence number of the PDU is zero.

In an embodiment, initiating the recovery process includes sending from the receiver a negative Acknowledgement (NACK) message for a Protocol Data Unit (PDU) that carries the portion of the IP packet, even though the PDU was received by the receiver. In another embodiment, initiating the recovery process includes causing a Radio Link Control (RLC) layer reset.

In yet another embodiment, verification of the IP version is performed in response to detecting that a non-ciphered header of the IP packet does not enable detection of the improper replacement of the ciphering key. In still another embodiment, deciphering the portion includes deciphering a beginning of the IP packet.

There is additionally provided, in accordance with an embodiment of the present invention, an apparatus including a front-end and processing circuitry. The front-end is configured to receive signals that carry Internet Protocol (IP) packets. The processing circuitry is configured to identify an event that involves replacement of a ciphering key used for ciphering the IP packets, to decipher using the replaced ciphering key, in response to the event, at least a portion of a payload of a received Internet Protocol (IP) packet, to verify whether a predefined location in the deciphered portion of the received IP packet, which is expected to specify an IP version of the IP packet, indeed specifies a valid IP version, and, upon detecting that the location does not specify the valid IP version, to initiate a recovery process that recovers from improper replacement of the ciphering key.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
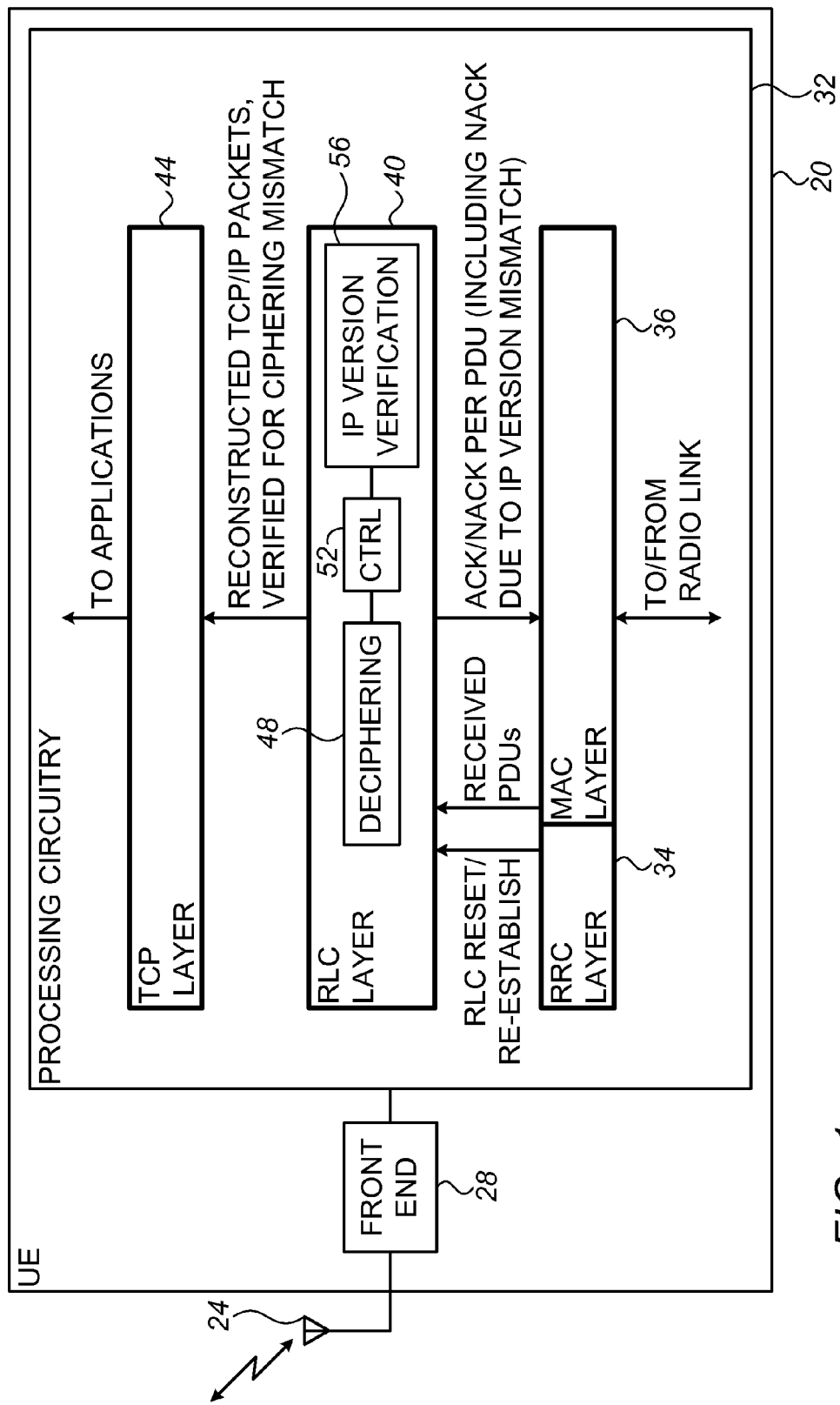
FIG. 1 is a block diagram that schematically illustrates a mobile communication terminal employing fast recovery from ciphering key mismatch, in accordance with an embodiment that is described herein.

Embodiments that are described herein provide improved methods and systems for identifying and recovering from ciphering key mismatch between a transmitter and a receiver. The embodiments described herein refer mainly to communication between a UMTS base station (NodeB) and terminal (User Equipment—UE), but the disclosed techniques are applicable to other suitable types of transmitters and receivers and to other suitable communication protocols.

In some embodiments, the receiver operates in layers, comprising at least a Radio Link Control (RLC) layer, a Medium Access Control (MAC) layer and a Transmission Control Protocol (TCP) layer. The receiver receives from the transmitter TCP-over-Internet-Protocol (TCP/IP) packets that convey encrypted data. The MAC layer formats the received data in Protocol Data Units (PDUs) whose payloads contain the encrypted data. The RLC layer decrypts the payloads of the PDUs, aggregates decrypted data from multiple PDUs into IP packets, and forwards the packets to the TCP layer for subsequent processing. The IP packets are also referred to as Service Data Units (SDUs). The terms "IP packets," "TCP packets," "packets" and "SDUs" are used interchangeably herein.

In an embodiment, the RLC layers in the transmitter and receiver derive their respective ciphering keys from a counter value that is incremented individually at each end of the link and not transmitted over the air. In UMTS, for example, the counter value is referred to as a Hyper-Frame Number (HFN). Any mismatch in HFN value between the transmitter and the receiver causes a decryption error that has to be recovered from. Events that involve replacement of the ciphering key, such as RLC reset or re-establishment, are especially prone to ciphering key mismatch.

In some practical cases, it is difficult to identify ciphering key mismatch in the RLC layer. For example, in some UMTS configurations the headers of the RLC PDUs are entirely unencrypted, whereas the encrypted payloads of the RLC PDUs contain only TCP data. In such cases it is possible in principle to defer the task of detecting ciphering key mismatch to the higher TCP layer. Error detection and recovery by the TCP layer, however, is extremely slow and degrades performance and user experience.

In some embodiments that are described herein, the receiver's RLC layer detects ciphering key mismatch by inspecting data in the PDU payloads after decryption. As noted above, the PDU payloads are conventionally handled transparently by the RLC layer and intended for processing only by the TCP layer. By deliberately inspecting data destined for a different layer, the RLC layer is able to detect and recover from ciphering key mismatch rapidly and with minimal disruption of service.

In an example detection and recovery process, the receiver's RLC layer identifies an event that involves ciphering key replacement, e.g., RLC reset or re-establishment. The RLC layer concludes that the next PDU to be received following the event is a first PDU in a new IP packet. The RLC layer deciphers at least a portion of the payload of this PDU, and verifies whether a predefined location in the deciphered payload, which is expected to specify the IP version of the IP packet, indeed specifies a valid IP version (e.g., 0x4 or 0x6, corresponding respectively to IPv4 and IPv6). If not, the RLC layer concludes that ciphering key mismatch has occurred and initiates a recovery process, e.g., by issuing a Negative Acknowledgement (NACK) for the PDU in question.

FIG. 1 is a block diagram that schematically illustrates a mobile communication terminal 20, in accordance with an embodiment that is described herein. In various embodiments terminal 20 comprises, for example, a mobile phone, a smartphone, a wireless-enabled computing device, or any other suitable type of terminal.

In the present example terminal 20 operates in accordance with the UMTS specifications, e.g., TS 25.322 and TS 33.102, cited above. In accordance with UMTS terminology, terminal 20 is also referred to as a User Equipment (UE). In alternative embodiments, terminal 20 may operate in accordance with any other suitable communication standard or protocol.

In the embodiment of FIG. 1, UE 20 comprises at least one antenna 24, a front-end 28 and processing circuitry 32. Front-end 28 is configured to receive Radio Frequency (RF) signals from a base station (not shown) with which the UE communicates and to transmit RF signals to the base station via antenna 24. Front-end 28 typically down-converts the received RF signals to baseband, and up-converts the signals to be transmitted from baseband to RF. Processing circuitry 32 is configured to perform the various digital and baseband processing tasks of the terminal.

The description that follows refers mainly to the downlink reception functions of processing circuitry 32, for the sake of clarity. Thus, in the context of the present patent application and in the claims, processing circuitry 32 is also referred to simply as a receiver.

In an embodiment, processing in circuitry 32 is performed in layers, comprising, for example, a Radio Resource Control (RRC) layer that controls the other layers (e.g., Physical, MAC and RLC), a physical layer (PHY) that controls physical radio resources, a Medium Access Control (MAC) layer, a Radio Link Control (RLC) layer that performs link-level control, and a Transmission Control Protocol (TCP) layer that carries out transport-layer functions, e.g., TCP/IP processing. Accordingly, processing circuitry 32 comprises an RRC layer unit 34, a MAC layer unit 36, a RLC layer unit 40 and a TCP layer unit 44, each unit carrying out the tasks relating to its respective layer.

In the present example, RLC layer unit 40 comprises a deciphering module 48 and an Internet Protocol (IP) version verification module 56, whose functions are explained in detail further below. A control module 52 manages the operation of RLC layer unit 40.

The configurations of UE 20 and processing circuitry 32 shown in FIG. 1 are example configurations, which are depicted in a highly simplified manner solely for the sake of clarity. In alternative embodiments, any other suitable UE and processing circuitry configurations can be used. UE and processing circuitry elements that are not mandatory for understanding of the disclosed techniques, such as elements relating to uplink transmission, have been omitted from the figure for the sake of clarity.

In various embodiments, some or all of the elements of UE 20, including front-end 28 and processing circuitry 32, are implemented in hardware, such as implementing elements of the front-end using one or more Radio Frequency Integrated Circuits (RFICs), or implementing the processing circuitry using one or more Field-Programmable Gate Arrays (FPGAs) or Application-Specific Integrated Circuits (ASICs). In alternative embodiments, certain elements of UE 20 are implemented in software, or using a combination of hardware and software elements.

In some embodiments, certain UE elements, such as certain elements of processing circuitry 32, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In a typical flow of receiving IP packets by UE 20, MAC layer unit 36 receives from the radio link downlink data originating from the base station. MAC layer unit 36 formats the data in Protocol Data Units (PDUs), and forwards the PDUs to RLC layer unit 40. Each PDU is typically on the order of forty or eighty bytes in size, and comprises a header and a payload.

The PDU payload is typically ciphered, whereas the PDU header is typically not ciphered. RLC layer unit 40 deciphers the payloads of the received PDUs using deciphering module 48, aggregates the deciphered payloads so as to reconstruct IP packets, and forwards the IP packets to TCP layer unit 44. Unit 44 carries out the various TCP/IP processing functions, and forwards the received packet data to their destinations, e.g., to applications running in UE 20.

In accordance with the UMTS specifications, ciphering (i.e., encryption and decryption) is performed in the RLC layer. The ciphering key used for encryption and decryption is calculated based on an incrementing counter value referred to as a Hyper-Frame Number (HFN). The HFN value is not transmitted over the air, but rather incremented independently by the RLC layer in the base station and by RLC layer unit 40 in UE 20.

Any mismatch in the HFN value between the base station and UE 20 will result in deciphering error, since deciphering module 48 will attempt to decipher the data using a wrong key. Events such as RLC reset or re-establishment, which involve coordinated replacement of the ciphering key in the base station and the UE, are particularly prone to ciphering key mismatch. Generally, however, ciphering key mismatch may occur at any time. In some embodiments, RLC layer unit 40 in UE 20 identifies an event that involves replacement of the ciphering key, and examines decrypted data in the first RLC PDU received after the event, so as to detect ciphering key mismatch.

Figure 2:
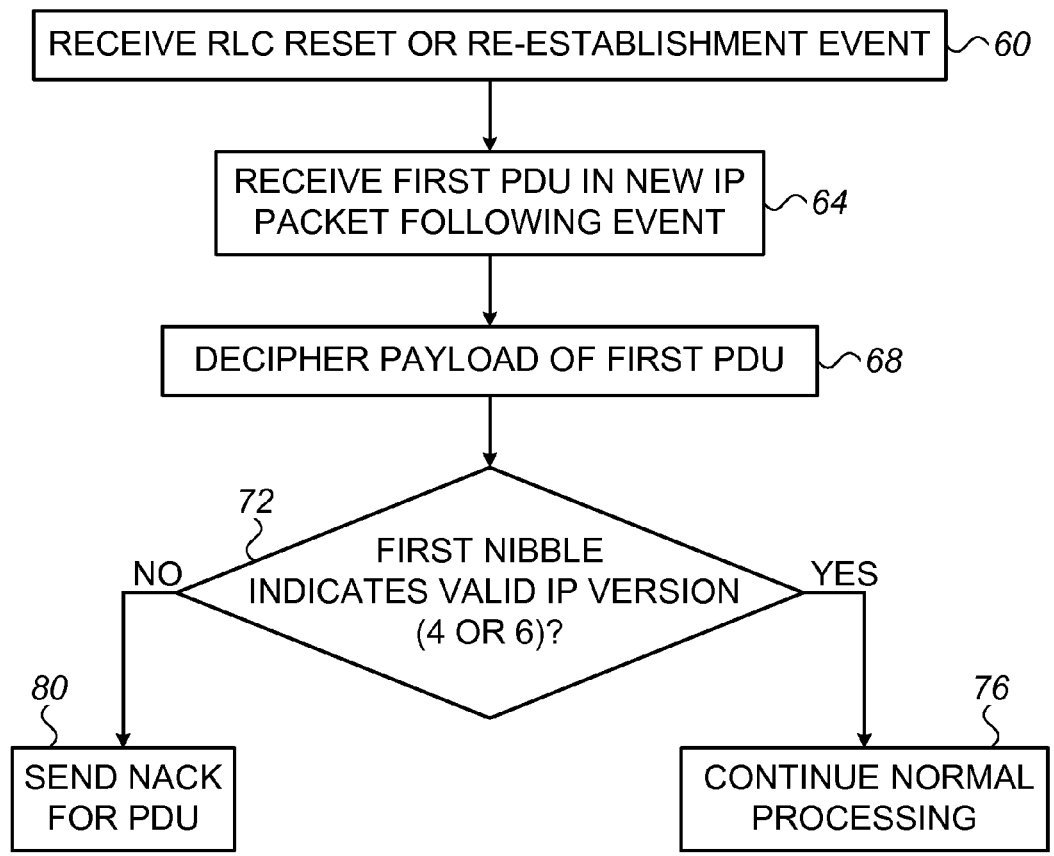
FIG. 2 is a flow chart that schematically illustrates a method for fast recovery from ciphering key mismatch, in accordance with an embodiment that is described herein.

FIG. 2 is a flow chart that schematically illustrates a method for fast recovery from ciphering key mismatch, in accordance with an embodiment that is described herein. The method begins with control module 52 in RLC layer unit 40 identifying an event that involves resetting of the ciphering key, at an event identification operation 60. In an example embodiment, control module 52 receives an RLC reset or re-establishment indication from RRC layer unit 34. Alternatively, control module 52 may identify the event in any other suitable way.

RLC layer unit 40 receives the first PDU following the event, at a PDU reception operation 64. Since the ciphering key has just been reset, control module 52 in RLC layer unit 40 concludes that the first PDU received after the event is a first PDU in a new IP packet (SDU). See, for example, section 9.7.7 of the 3GPP TS 25.322 specification, cited above. In an embodiment, control module 52 identifies the first PDU in the IP packet by verifying that the sequence number of the PDU is equal to zero (PDU SN==0).

In this embodiment, control module 52 uses the fact that the first four bits (nibble) in the payload of the first PDU in an IP packet specify the IP version being used. Therefore, the first nibble in this PDU has only two legitimate values—0x4 indicating IPv4 or 0x6 indicating IPv6.

Thus, deciphering module 48 in RLC layer unit 40 decrypts the payload of the first PDU (or a portion thereof) using the newly-reset key, at a deciphering operation 68. At a verification operation 72, IP version validation module 56 in RLC layer unit 40 checks whether the first four bits in the decrypted payload indeed indicate a valid IP version (0x4 or 0x6).

If the decrypted first nibble indicates a valid IP version, reception proceeds normally and the method terminates, at a success termination operation 76. Otherwise, control module 52 initiates a recovery process, at a recovery operation 80.

In the present example, control module 52 initiates the recovery process by sending a Negative Acknowledgement (NACK) for the first PDU to MAC layer unit 36, for forwarding to the RLC layer of the base station. Note that this specific NACK is sent even though the PDU was received (albeit with ciphering mismatch). In response to the NACK, the base station RLC layer will retransmit the first PDU. RLC layer unit 40 will again detect a ciphering key mismatch in the retransmitted PDU, and so on. When the number of retransmissions reaches the maximum allowed number, the RLC layer will issue an RLC reset that will reset the ciphering key and resolve the mismatch.

Since the recovery process described above is performed between the peer RLC layers in the UE and the base station (as opposed to a conventional process between the peer TCP layers) recovery is fast and incurs minimal service disruption.

In an alternative embodiment, RLC layer unit 40 initiates the recovery process by directly issuing or requesting an RLC reset, or by refraining from sending a positive acknowledgement (ACK), instead of sending a NACK. Further alternatively, RLC layer unit 40 may initiate the recovery process in any other suitable way.

It is noted that the disclosed detection mechanism has only a probability of success of at least 14/16 (which may be increased by validating more TCP/IP header fields), since a decryption error may still produce a value of 0x4 or 0x6 in the first nibble of the payload (and other valid fields). This probability is nevertheless high. Any remaining mismatch events are typically handled by the TCP layer, however with a comparatively longer recovery time.

The process shown in FIG. 2 is an example detection and recovery process that is depicted solely for the sake of conceptual clarity. In alternative embodiments, processing circuitry 32 may carry out any other suitable process for detecting and/or recovering from ciphering key mismatch.

For example, in an alternative embodiment the detection process is not necessarily invoked following resetting of the ciphering key. In an example embodiment, RLC layer unit 40 applies the process of FIG. 2 to the first PDU of every IP packet, or to the first PDUs of selected packets. Performing the detection process only following resetting of the ciphering key is sometimes preferable, for example, because it focuses on the most vulnerable events while reducing power consumption.

In another embodiment, control module 52 carries out the process of FIG. 2 only upon verifying that the PDU headers do not contain encrypted information (e.g., Length Indication—LI), which can be used for detecting mismatch without examining the payload. Mismatch detection using the LI field in the PDU header is specified, for example, in section 10.3 of the 3GPP TS 25.322 specification, cited above.

Although the embodiments described herein refer mainly to detection and recovery from ciphering key mismatch in a downlink receiver of a mobile terminal, the disclosed techniques are applicable to various other kinds of receivers. For example, in an embodiment, the disclosed techniques are implemented in an uplink receiver of a base station.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:
1. A method, comprising:
 in a receiver, identifying replacement of a ciphering key used by the receiver to a new ciphering key;
 in response to the replacement, deciphering, using a different ciphering key, at least a portion of a payload of an Internet Protocol (IP) packet received by the receiver, wherein the portion is ciphered and comprises a predefined field that specifies an IP version of the IP packet;

verifying whether, after deciphering, the predefined field indeed specifies a valid IP version; and upon detecting that the predefined field does not specify any valid IP version, initiating a recovery process that recovers from improper replacement of the ciphering key.

2. The method according to claim 1, wherein verification of the IP version and initiation of the recovery process are performed in a Radio Link Control (RLC) layer of the receiver.

3. The method according to claim 1, wherein deciphering the portion comprises identifying a Protocol Data Unit (PDU) that immediately follows the replacement and contains a beginning of the IP packet, and deciphering the beginning of the IP packet extracted from the identified PDU.

4. The method according to claim 3, wherein identifying the PDU comprises verifying that a sequence number of the PDU is zero.

5. The method according to claim 1, wherein initiating the recovery process comprises sending from the receiver a negative Acknowledgement (NACK) message for a Protocol Data Unit (PDU) that carries the portion of the IP packet, even though the PDU was received by the receiver.

6. The method according to claim 1, wherein initiating the recovery process comprises causing a Radio Link Control (RLC) layer reset.

7. The method according to claim 1, wherein verification of the IP version is performed in response to detecting that a non-ciphered header of the IP packet does not enable detection of the improper replacement of the ciphering key.

8. The method according to claim 1, wherein deciphering the portion comprises deciphering a beginning of the IP packet.

9. Apparatus, comprising:
a front-end, which is configured to receive signals that carry Internet Protocol (IP) packets; and
processing circuitry, which is configured to identify replacement of a ciphering key used for ciphering the IP packets to a new ciphering key, to decipher using a different ciphering key, in response to the replacement, at least a portion of a payload of a received Internet Protocol (IP) packet, wherein the portion is ciphered and comprises a predefined field that specifies an IP version of the IP packet, to verify whether, after deciphering, the predefined field indeed specifies a valid IP version, and, upon detecting that the predefined field does not specify any valid IP version, to initiate a recovery process that recovers from improper replacement of the ciphering key.

10. The apparatus according to claim 9, wherein the processing circuitry is configured to verify the IP version and initiate the recovery process in a Radio Link Control (RLC) layer.

11. The apparatus according to claim 9, wherein the processing circuitry is configured to identify a Protocol Data Unit (PDU) that immediately follows the replacement and contains a beginning of the IP packet, and to decipher the beginning of the IP packet extracted from the identified PDU.

12. The apparatus according to claim 11, wherein the processing circuitry is configured to identify the PDU by verifying that a sequence number of the PDU is zero.

13. The apparatus according to claim 9, wherein the processing circuitry is configured to initiate the recovery process by sending a negative Acknowledgement (NACK) message for a Protocol Data Unit (PDU) that carries the portion of the IP packet, even though the PDU was received.

14. The apparatus according to claim 9, wherein the processing circuitry is configured to initiate the recovery process by causing a Radio Link Control (RLC) layer reset.

15. The apparatus according to claim 9, wherein the processing circuitry is configured to verify the IP version in response to detecting that a non-ciphered header of the IP packet does not enable detection of the improper replacement of the ciphering key.

16. The apparatus according to claim 9, wherein the portion comprises a beginning of the IP packet.

17. A mobile communication terminal comprising the apparatus of claim 9.

18. A chipset for processing signals in a mobile communication terminal, comprising the apparatus of claim 9.

* * * * *